Jan. 10, 1939.    J. M. FISHER    2,143,437
RADIANT ENERGY SYSTEM
Filed July 17, 1934    3 Sheets-Sheet 1

Inventor
James Marion Fisher
By Murray & Pugelter
Attorney

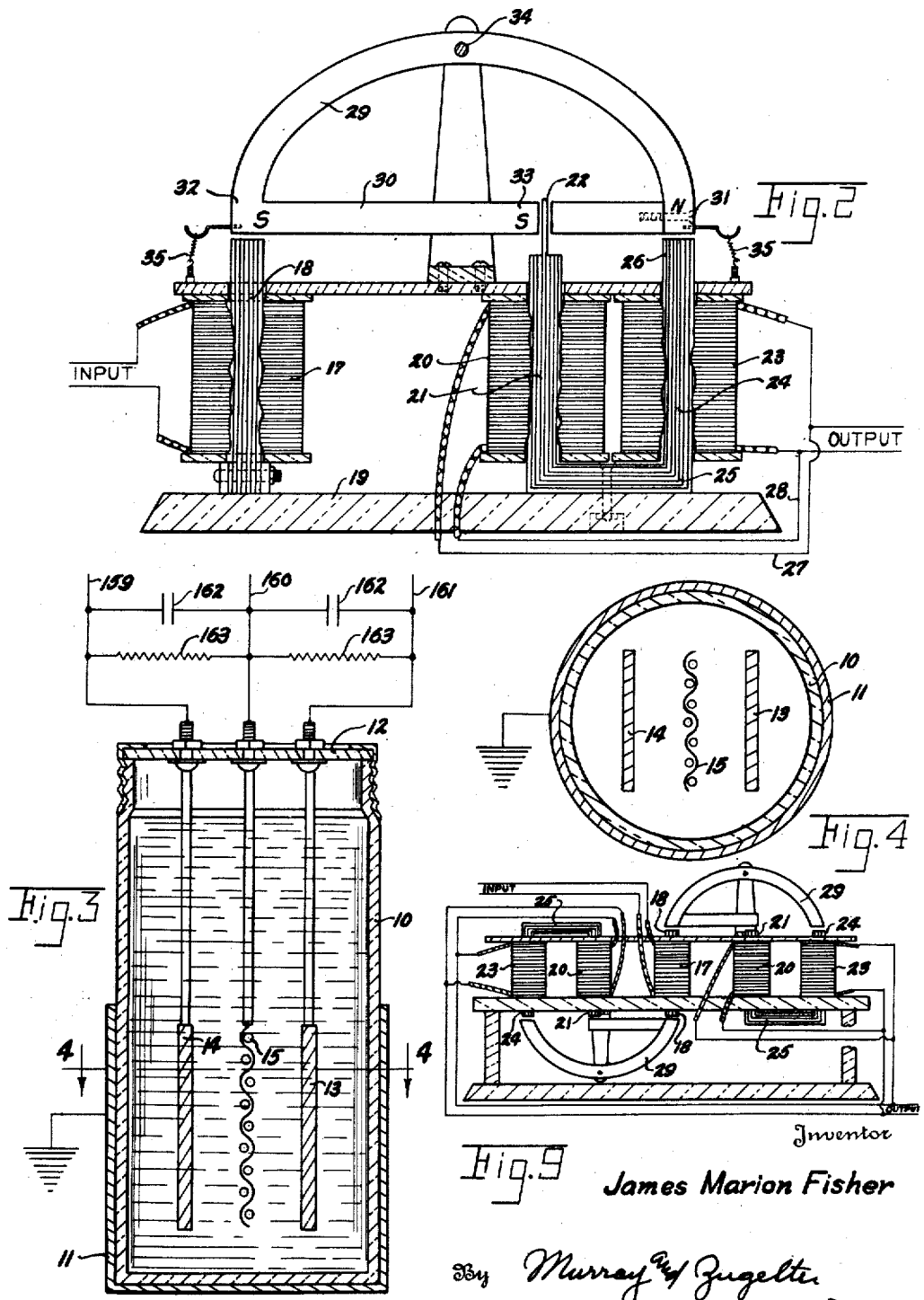

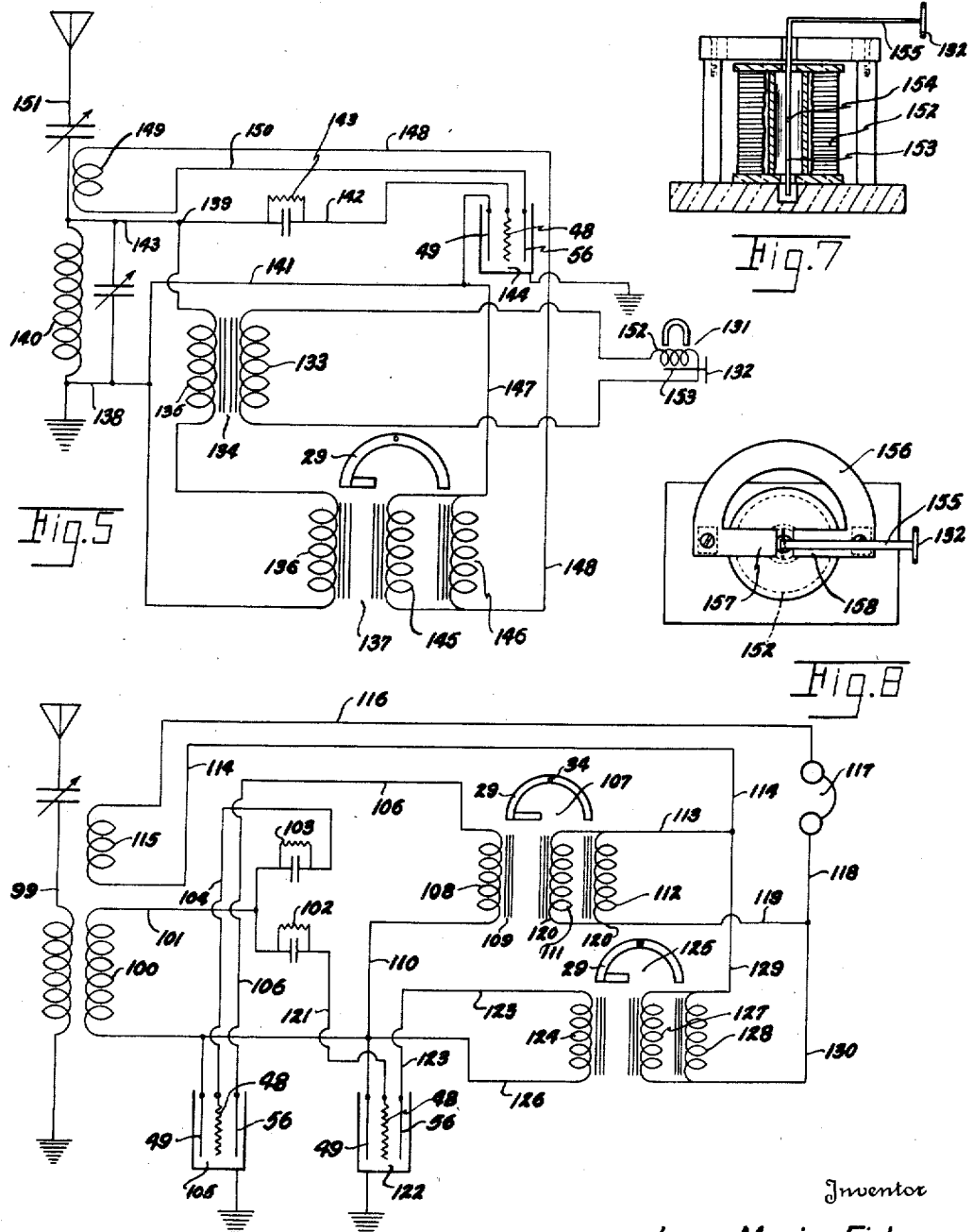

Patented Jan. 10, 1939

2,143,437

UNITED STATES PATENT OFFICE 2,143,437

RADIANT ENERGY SYSTEM

James Marion Fisher, Covington, Ky., assignor to The Radiant Energies Corporation, Cincinnati, Ohio, a corporation of Ohio Application July 17, 1934, Serial No. 735,679

5 Claims. (Cl. 178—44)

The present invention relates to apparatus for receiving and transmitting radiant energy within a wide range of frequencies and has for an object the provision of apparatus of this kind that is operative without the necessity of source of local energy such as commercial current or batteries.

Another object of the invention is to provide in a radiant wave receiver a means including a rectifier and a magnetic pulsating generator whereby the incoming wave of low strength is instrumental in energizing said magnetic pulsating generator to produce a desired E. M. F.

A further object of the invention is to provide a chemical rectifier and a magnetic pulsating generator in a tuning circuit for accomplishing the foregoing mentioned objects.

A further object of the invention is to provide an improved magnetic pulsating generator that is susceptible to comparatively weak electrical impulses.

Another object of the invention is to provide apparatus useful variously, and including radio signal receiving whereby the incoming wave is rectified and amplified without the use of vacuum tubes or commercial local power until it attains the desired E. M. F. to actuate a utilizing instrumentality such as a loud speaker.

These and other objects are attained by the means described herein and disclosed in the accompanying drawings, in which:

Fig. 2 is an elevational view of the improved magnetic pulsating generator of the invention.

Figs. 3 and 4 are elevational and cross sectional views, respectively, of the chemical rectifier of the invention.

Fig. 5 is a circuit diagram for a transmitter of radiant energy shown specifically for radio transmission.

Fig. 6 is a circuit diagram showing a radio receiver hook-up adapted for full wave rectification and amplification up to audio signal strength.

Figs. 7 and 8 are respectively vertical section and top plan views of a magnetic microphone usable with the present invention.

Fig. 9 is a diagrammatic view of a modified form of magnetic pulsating generator of the invention.

Figure 1:
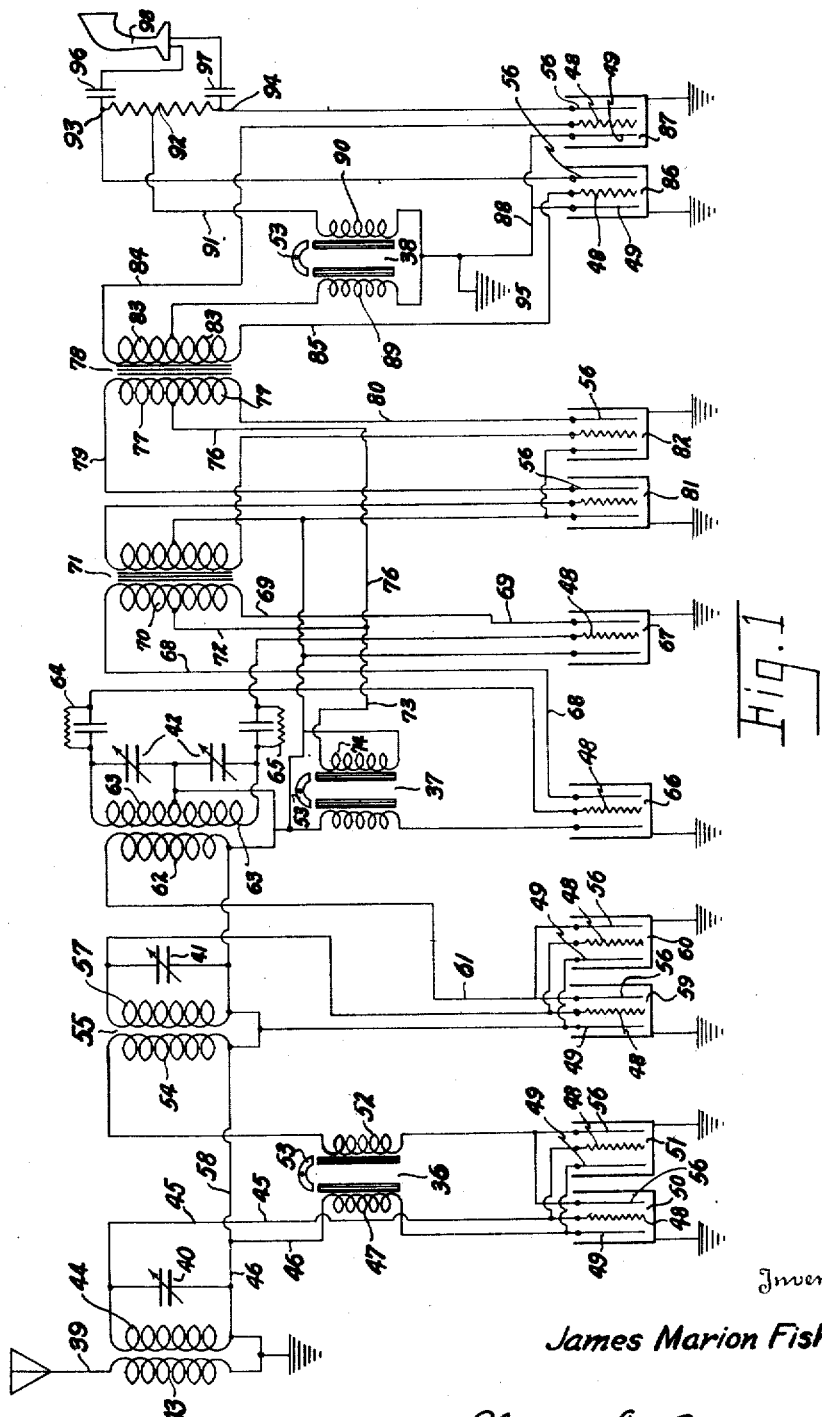
Fig. 1 is a wiring diagram of a radio receiving circuit showing schematically the chemical rectifiers and the magnetic pulsating generators of the invention.

This application is a continuation in part of my copending application Serial No. 719,363, filed April 6, 1934.

The present invention makes use of either a full radiant energy wave or half of such waves from whatever source and is adapted for use without local commercial electricity or batteries. Circuits made up with the devices of the invention are also adaptable in other devices that utilize commercial or battery current.

In each of the operative embodiments of the present invention there is included essentially an antenna or other means for wave reception from broadcast or other source as the case may be in a suitable hook-up as suggested in the several drawings and the chemical rectifier or rectifiers and magnetic pulsating generator or generators. The vital elements of the invention in whatever embodiment it may be used are constituted by the chemical rectifier and the magnetic pulsating generator. The chemical rectifier may be made in several forms but consists essentially of an insulating container 10 having an outer grounded metallic coating 11 extending at least partly over the exterior and a top closure member 12 from which are suspended in insulated relation three electrodes of similar metals having low resistance to flow of electrical energy. These electrodes 13 and 14 are plate elements and 15 is a screen or reticulated element which is interposed between elements 13 and 14. Contained within the member 10 is a solution of mercuric salts, Rochelle salts, and water, in the proportion of about five parts mercuric salts, 5 parts zinc sulphate, 5 parts copper sulphate, ten parts Rochelle salts, and the balance water to make one hundred parts. It is understood that some variation in the proportions of the salts may be made. Proportions given are productive of good results.

The plates and screen electrodes in the electrolyte serve the purpose of the conventional thermionic tube without need for a filament and its energizing current.

The electrodes are preferably of copper, but with a different chemical solution other conductive material of as low resistance to the flow of electrical energy as possible may be used. In operation the chemical rectifier has the screen or grid element 15 connected to one side of an input source of alternating current and the plate 14 connected to the opposite side of the A. C. circuit. The incoming impulse passes from the screen 15 through the solution 16 to plate 14, but does not allow a reverse flow to the screen. The plate 13 thereby becomes a positive electrode and plate 14 a negative electrode which receives current flow from both screen 15 and plate 13.

Alternatively stated, screen 15 and plate 14 may be made the input terminals for the alternating current and plates 13 and 14 the output terminals for the rectified or direct current.

The chemical rectifiers may be made of an overall size comparable with present day thermionic tubes, the metallic coating 11 being conductively connected with a metallic mounting base if desired. In practice the plate 14 constituting one side of the input to the rectifier is somewhat closer to the screen or grid 15 than the plate 13 which forms one side of the output. The output is more favorably intensified under these circumstances. Input and output connections to the chemical rectifier may be interchanged so long as screen or grid 15 has no output connection.

The magnetic pulsating generator of the present invention consists essentially of an electromagnetic coil 17 having a suitable laminated core 18 and adapted to have its opposite ends connected to an input source in such manner as to produce a north magnetic pole at the top of core 18. This is suitably mounted in insulated relation upon a non-magnetic base 19 which also supports electromagnet coil 20 having a core 21 collecting a south pole magnetic force at its top 22 which extends somewhat above the level of the top of core 18 of the electromagnet coil 17. An electromagnet coil 23 has a core 24 magnetically connected as at 25 to form a U-shaped core with the core 21 of coil 20, and the top end 26 of core 24 will, upon energization of the coils, become a north magnetic pole. Coils 20 and 23 are connected in parallel by conductors 27 and 28, the continuation of which forms the output portion of the device.

Mounted for oscillation above the aligned cores 18, 21 and 24 is a permanent magnet comprising an arcuate portion 29 having a normaly substantially horizontal leg 30 that extends from the top of core 18 substantially to the top of core 21. The permanent magnet has its north pole at 31 which is directly above the top of core 24 and has south magnetic polarity at points 32 and 33 which are adjacent the top of cores 18 and 21, respectively. The permanent magnet assembly is pivotally mounted at 34 in magnetically insulated relation and is adapted to oscillate on its pivot in response to the polarities set up in the several electromagnet coils. It is to be understood that the pivotal mounting 34 is to be of anti-friction variety so as to allow the permanent magnet to be readily responsive to attraction and repulsion of the electromagnet cores. To this end, and to avoid oscillation due to physical vibrations, light sustaining springs 35 of non-magnetic material may be employed at the opposite ends of the arcuate portion of the permanent magnet or any other readily yieldable stabilizing means may be employed. The operation of the magnetic pulsating generator per se is as follows: alternating impulses received in coil 17 set up north and south magnetic polarity alternately at the top of core 18. When the polarity at the top of core 18 is of a north variety the adjacent portion 32 of the permanent magnet which is south pole variety is attracted thereto, rocking the permanent magnetic structure on its axis and causing the end 33 to move relative to the end 22 of core 21 and thereby inducing an E. M. F. in the coil 20. The induced current from coil 20 passes through coil 23 setting up north magnetic polarity in the end 26 of core 24 and increasing the magnetic repulsion between it and the point 31 of the permanent magnet. When the other half of the input alternating current impulse is received in coil 17 the induction of current in coil 20, the passage of current therefrom to coil 24 and the sum total output is repeated in reversed polarity. Thus, the magnetic pulsating generator is susceptible of receiving in the input coil 17 a very weak alternating impulse, as low, for example, as the order of thirty thousandths of a volt and will deliver from the output coils an alternating current of materially augmented strength, e. g., five to ten times greater than that of the input impulse. The arrangement of these magnetic pulsating generators in electrical succession with the chemical rectifiers of the invention inserted in circuit therewith as hereinafter explained enables the progressive building up of the E. M. F. to the desired voltage. When the input to coil 17 is of weak pulsating D. C. variety, the output from coils 20 and 24 will be of like variety but of increased voltage.

Fig. 1 shows a conventional radio hook-up containing two stages of radio frequency amplification, a push-pull detector, and one stage of push-pull output amplification. When a hook-up such as shown in Fig. 1 is tuned and is receiving a frequency of several hundred kilocycles at a strength of about thirty thousandths of a volt, the ultimate output voltage will be approximately twenty volts under favorable conditions. The magnetic pulsating generator serves to materially if not completely suppress static or stray impulses impressed upon the circuit due to the fact that the incoming signal representing the sound wave is of higher E. M. F. value than the background or static imposed impulse. This is true because the stray impulses or static disturbances are of a generally much lower wave length and E. M. F. value and therefore do not carry through in proportional values to those of the sound waves. When a plurality of the magnetic pulsating generators are used in a radio circuit, as for example in Fig. 1, the perceptible static disturbance appears to be completely eliminated under almost all circumstances. It will be understood of course that any stray impulses of such nature as would create arcing from the antenna to ground would not be suppressed.

In this connection it is to be understood that the magnetic pulsating generators as shown in Fig. 2 may be connected in the circuit of present day radio receivers as a means of suppressing static and kindred stray disturbances. To accomplish the latter, it may be explained in a general fashion that the magnetic pulsating generators would be connected in series in the grounding circuit of the radio frequency and audio frequency transformers.

In Fig. 1 there is shown a hook-up consisting of a tuning circuit, chemical rectifiers, and magnetic pulsating generators of the simplified form, and an amplifying circuit, the tuning circuit being used to tune the wave received while the said magnetic pulsating generators serve to charge the chemical rectifiers and to discharge the rectified E. M. F. to other parts of the set. The simplified form of magnetic pulsating generator eliminates the element corresponding to electromagnetic coil 20 of Fig. 2. These simplified magnetic pulsating generators are indicated generally as 36, 37, and 38 in Fig. 1. The operation of the device as disclosed in Fig. 1 is as follows: assuming the antenna circuit 39 to be tuned to a given wave length by variable condensers 40, 41 and 42, the direction of current through the device is as follows, the alternating wave passing from primary 43 to secondary 44 passes by way of conductors 45 and 46 through coil 47 of the pulsator 36 and through the screen and plate 48 and 49, respectively, of the pair of chemical rectifiers 50 and 51 which are connected in parallel. This induces a voltage in coil 52 of the generator 36 due to the oscillation of the magnet 53. This pulsating E. M. F. passes to the top of primary winding 54 of a radio frequency transformer indicated generally at 55 from which primary the current returns through ground conductor 58. This E. M. F. also passes through the chemical rectifiers 50 and 51 and coil 47. This forms a valving action between plates or electrodes 49 and 56. The primary 54 and secondary 57 of transformer 55 are connected to the ground wire 58 and to the plates 49 of a second pair of rectifiers 59 and 60, thus effecting a substantial duplication of the operation of the previously described radio frequency amplification save that the magnetic pulsating generator is omitted from the circuit. Plates 56 of chemical rectifiers 59 and 60 are connected to conductor 61 which leads to the primary 62 of the radio frequency detector coils. The output of secondary detector coils 63 passes through grid leak condensers 64 and 65, respectively, to the screen elements 48 of chemical rectifiers 66 and 67, respectively, and where D. C. pulsating E. M. F. is delivered through conductors 68 and 69 of the primary winding 70 of push-pull transformer 71. The return circuit to the ground from said primary coils is through conductors 72 and 73 and electromagnet coil 74 of the magnetic pulsating generator 37 which is, during the same interval, setting up an augmented D. C. pulsating E. M. F. through conductors 75 and 76 to the primaries 77 of an output push-pull transformer 78. The ground return lines from primaries 77 of the push-pull transformer 78 is through conductors 79 and 80 which are connected to plate elements 56 of a pair of chemical rectifiers 81 and 82 connected in parallel in the manner characteristically set forth in the preceding description. The output of secondary coils 83 of the push-pull transformer 78 passes by way of conductors 84 and 85 to the screen elements 48 of a pair of chemical rectifiers 86 and 87, respectively. The flow from elements 48 is through the chemical rectifiers 86 and 87 to the plates 49 thereof which are connected together by conductor 88 which leads to the bottom of coils 89 and 90 of magnetic pulsating generator 38, and sets up a D. C. pulsating E. M. F. in coil 90 from whence the E. M. F. is delivered through conductor 91 to resistance output 92 This resistance is of the order of 2000 ohms on either side of its connection with the conductor 91 and the E. M. F. flowing from the ends 93 and 94 of said resistance is delivered, respectively, to the plate elements 56 of the chemical rectifiers 86 and 87 from whence it flows to the plates 49 of said rectifiers and hence to the ground at 95. The energy is collected from the ends 93 and 94 of the resistance 92 in fixed condensers 96 and 97 which may be of the order of .01 microfarad and from thence to a point of utilization which in this circuit is a low resistance magnetic type loud speaker 98.

Fig. 6 shows a simple hook-up embodying the principles involved in the improved full-wave rectification of radiant energy waves in accordance with this invention. The principles thereof will be explained so that they may be applied to more complex embodiments, by those conversant with the art. A radio receiver, such as shown in Fig. 1 may readily have the full wave rectification applied thereto to produce increased efficiency with clear and stronger reception.

It is a further and important feature of the full wave rectification arrangement, that with a relatively few stages of amplification a current of high voltage may be generated from a relatively weak radiant wave and this voltage may be stepped down to a commercially usable voltage of practical amperage.

In Fig. 6 the receiver hook-up comprises the usual antenna 99 in a circuit of suitable design from the secondary 100 of which the signal E. M. F. passes over conductor 101 to a pair of grid leak condensers 102 and 103 which are connected thereto in parallel. The resistance of the grid leaks is of the order of three megohms and the condensers have a capacity of .00025 microfarad. The E. M. F. passing grid leak 103 follows conductor 104 to the screen 48 of a chemical rectifier 105 so that the rectification of the alternating E. M. F. takes place between member 48 and plate 49 and direct pulsating E. M. F. is taken off from plate 56 through conductor 106 over which it passes to one of a pair of magnetic pulsating generators 107 passing through the coil 108 and energizing the core 109 and returning to its negative or common ground through conductor 110. The magnetic pulsating generators in this embodiment are of the type shown in Fig. 2, the like parts other than the coils being referred to by like reference numerals. The permanent magnet 29 is oscillated by the pulsating E. M. F. in coil and core 108—109 and the movement of the pole causing a positive charge to be set up in the coils 111 and 112 which is taken off through conductor 113 connected across the top ends of said coils. The conductor 113 is connected with conductor 114 which leads to a regenerating coil 115 in the antenna circuit regenerating back to coil 100 for increasing oscillations therein. The opposite end of coil 115 connects by conductor 116 to a utilizing instrumentality, e. g., the head phones 117. The opposite sides of head phones 117 are connected by conductors 118 and 119 to the negative ends 120 of coils 111 and 112.

The E. M. F. passing grid leak condenser 102 follows conductor 121 to screen element 48 of chemical rectifier 122 effecting rectification between it and plate 49 of said chemical rectifier and putting forth D. C. pulsating E. M. F. through plate 56 of the chemical rectifier and conductor 123 which connects with the top of coil 124 in the second of the pair of magnetic pulsating generators indicated generally at 125. Coil 124 is grounded to conductor 126. The D. C. pulsating E. M. F. energizes coil 124 and its core effecting oscillation of the permanent magnet 29 in the manner previously described. This sets up the augmented pulsating D. C. E. M. F. the positive of which is taken from the top of electromagnet coils 127 and 128 passes through conductor 129 and thence over the conductor 114 through regenerating coil 115 and conductor 116 to the head phones 117 and thence over conductor 118 to the negative side of coils 127 and 128 through conductor 130.

The combination of the chemical rectifier and the magnetic pulsating generator as shown and described either in Fig. 1 or as shown in Fig. 2 and described herein may be suitably connected in circuit with an activating instrumentality which may be a suitably controlled power source or which may be as shown in Fig. 5, a magnetic type microphone (hereinafter described) in which latter case the transmitter requires no source of local energy for the transmission of tuned energy waves having their origin in the vibrations produced from sound.

Referring now specifically to Fig. 5, a magnetic microphone 131, by the vibration of sound waves striking the diaphragm 132 thereof, sets up an alternating current in the primary 133 of a microphone transformer 134 and thereby energizes transformer secondary 135. The operation of the microphone is later detailed. The induced energy in secondary 135 passes from the lower end through electromagnet coil 136 of a magnetic pulsating generator 137 and thence to common ground line 138. The other end of coil 135 connects to a grid circuit at 139 so that the secondary energy builds up in antenna coil 140. This energy also builds up in conductors 141 and 142. Grid leak condenser 143 holds the energy at a substantial constant allowing it to pass to screen element 48 and plate 49 of a chemical rectifier 144. The energy in coil 136 causes rocking of permanent magnet 29 and this sets up an A. C. E. M. F. in coils 145 and 146. These coils are connected at one end by conductor 147 with plate 49 and at the opposite end by conductor 148 to coil 149 which has regenerative relation to coil 140. The coil 149 connects through conductor 150 with plate 56 of the chemical rectifier 144 where rectification or intensification takes place and this energy is impressed upon the antenna 151. In this operation the chemical rectifier serves as a valve.

As shown in Figs. 7 and 8 the magnetic type microphone comprises a hollow wound coil 152 through the center of which extends a magnetic reed 153 pivoted as at 154 and having an arm 155 extending from one end, said arm carrying a diaphragm 132. A permanent magnet 158, preferably of horse shoe type, has its opposite ends 157 and 153 disposed closely in the path of the armature or reed 153 so that oscillation of said armature about its pivot may induce the weak E. M. F. in coil 152 which is transmitted to the primary 133 of transformer 134.

It will be understood that the transmitter just described may be enlarged in accordance with known practice to include push-pull transformer connections of the general character illustrated in Fig. 1 and that with an increased number of the magnetic pulsating generators in series, greatly increased signal strength may be imposed upon the antenna.

It is also to be understood that the simplified form of magnetic pulsating generator illustrated in Fig. 1, may be utilized with somewhat decreased ultimate signal strength imposed upon the antenna. The operation and general formation of the hook-up will be readily appreciated by those conversant with the art by an inspection of Fig. 5 in conjunction with this statement.

Referring again to the preferred method of connecting the chemical rectifier (see Fig. 3) to an A. C. input source, the plate 14 would be connected to a conductor 159 and the screen member 15 would be connected to a conductor 160. The A. C. input would be connected to these connectors and the rectified current would be taken off through conductors 159 and 161, the latter conductor being connected to plate 13. Conductors 159 and 160 are bridged with a 1 microfarad fixed condenser and a three million ohm resistance. A similar arrangement is provided between conductors 160 and 161. The condensers are indicated at 162 and the resistances at 165.

The magnetic pulsating generator and the chemical rectifier of the invention are adaptable to use in television work, without any commercial current except that required by the customary photo-electric cell. A greatly clarified image is obtained in this case because, as previously explained, the magnetic pulsating generator and the chemical rectifier in conjunction effect a very material suppression of static or stray impulses. The magnetic pulsating generator and the chemical rectifier may be connected in a resistance coupled amplifier for this work.

The foregoing several disclosures will render clear to those skilled in the art, the manner in which the invention may be embodied in various devices that may employ radiant energy in any of its known applications. The embodiments illustrated and described are practical and are subject to modification and elaborations.

In Fig. 9 there is shown a pulsating generator with the parts identified as in Fig. 2. This is essentially a duplication of the permanent magnet 29 and output coils 20 and 23 operated from both ends of input coil 17 and its core 18. Under some conditions as much as 60% increase in output E. M. F. has been obtained compared with the output of the device of Fig. 2. Both of the magnets are simultaneously attracted to or repulsed by the ends of core 18 when coil 17 is energized. The movement of each magnet sets up useful voltages in its output coils 20 and 23 which feed to a common output circuit.

What is claimed is:

1. A magnetic pulsating generator comprising an input electromagnet coil, a laminated iron core therein, an output electromagnet coil, a laminated iron core for said output coil, a permanent magnet mounted for limited oscillation adjacent the ends of said cores, said permanent magnet having a pole disposed adjacent each of said cores, said cores being mounted in magnetically discontinuous relation whereby a relatively weak energization of said input coil may effect oscillation of the permanent magnet to induce an electromotive force in said output coil.

2. A magnetic pulsating generator comprising a core having an input coil thereon, a permanent magnet pivotally mounted with a pole thereof adjacent a pole of said core, a second core having an output coil thereon and having a pole thereof within the field of said permanent magnet, said output coil serving to build up an induced electromotive force upon oscillation of the permanent magnet by said input core and coil.

3. In a magnetic pulsating generator the combination of a U-shaped permanent magnet, a transverse integral bar portion on said magnet extending from one leg of said U-shaped portion toward the opposite leg of the U-shaped portion, said magnet having like poles at the junction of the leg and bar and at the free end of the bar, the end of the free leg of said magnet being of opposite polarity, insulating means mounting said magnet for oscillation, an input coil having a core terminating closely adjacent the junction of said leg and said bar portion of the magnet, a U-shaped laminated core having its ends respectively, disposed closely adjacent the end of the bar portion and the free leg of said permanent magnet and a pair of oppositely wound electromagnet coils on the legs of said U-shaped core, said last mentioned coils being adapted to be connected in parallel with a utilizing instrumentality.

4. A magnetic pulsating generator comprising an input electromagnet coil, a laminated iron core therein, a pair of output electromagnet coils, laminated iron cores therefor connected in magnetic continuity, one of said cores having a reduced and extended end, a permanent magnet mounted for limited oscillation adjacent the ends of all of said cores, said permanent magnet having a pole disposed adjacent each of the cores, and having the terminal poles thereof closely adjacent the reduced extended end of the core.

5. In a magnetic pulsating generator the combination of an input electromagnet coil, a core for said coil, a pair of U-shaped permanent magnets each having a bar portion extending from the end of one leg thereof towards the other leg, said magnets being mounted for oscillation and so disposed relative to the input core and coil as to dispose the junction of the leg and bar of one of said permanent magnets at each end of said core, pairs of oppositely wound electromagnet output coils disposed on each side of the input coil, each pair of output coils being disposed at one end closely adjacent the magnetic poles of the respective permanent magnets, each pair of output coils having cores in magnetic continuity and conductor means connecting all of the output electromagnet coils in parallel.

JAMES MARION FISHER.